(12) United States Patent
Tossavainen et al.

(10) Patent No.: US 10,085,462 B2
(45) Date of Patent: Oct. 2, 2018

(54) PROCESS FOR PRESERVING LOW-LACTOSE OR LACTOSE-FREE MILK PRODUCT

(75) Inventors: Olli Tossavainen, Espoo (FI); Harri Kallioinen, Haarajoki (FI)

(73) Assignee: VALIO LTD., Helsinki (FI)

( * ) Notice: Subject to any disclaimer, the term of this patent is extended or adjusted under 35 U.S.C. 154(b) by 2110 days.

(21) Appl. No.: 12/666,569

(22) PCT Filed: Jun. 26, 2008

(86) PCT No.: PCT/FI2008/050388
§ 371 (c)(1),
(2), (4) Date: Dec. 23, 2009

(87) PCT Pub. No.: WO2009/000972
PCT Pub. Date: Dec. 31, 2008

(65) Prior Publication Data
US 2010/0215828 A1    Aug. 26, 2010

(30) Foreign Application Priority Data
Jun. 26, 2007   (FI) ..................... 20075487

(51) Int. Cl.
*A23C 21/06*   (2006.01)
*A23C 9/146*   (2006.01)
(Continued)

(52) U.S. Cl.
CPC ............ *A23C 9/1465* (2013.01); *A23C 3/033* (2013.01); *A23C 9/1206* (2013.01);
(Continued)

(58) Field of Classification Search
USPC .......................... 426/34; 530/832; 210/656
See application file for complete search history.

(56) References Cited

U.S. PATENT DOCUMENTS 2,663,642 A * 12/1953 Whitaker ................ A23C 1/12
426/491
4,529,611 A    7/1985 Uiterwaal
(Continued)

FOREIGN PATENT DOCUMENTS

DE     23 54 475 A1   5/1974
EP     0 203 706      12/1986
(Continued)

OTHER PUBLICATIONS

Milk Processing by High Intensity Pulsed Electric Fields by Silvia Bendicho et al., Trends in Food Science & Technology 13 (2002), pp. 195-204.*

(Continued)

*Primary Examiner* — Tamra L. Dicus
(74) *Attorney, Agent, or Firm* — Nixon & Vanderhye P.C.

(57) ABSTRACT

The invention relates to a process for the production of well-preserving lactose-free and low-lactose milk products. The process of the invention is characterized by separating the sugars and proteins in a raw material, thermally treating them in such a manner that the plasmin enzyme system and other proteolytic enzymes are inactivated, and combining the fractions and other preparation agents into a drink with a required composition and properties.

15 Claims, 7 Drawing Sheets

(51) Int. Cl.
*A23C 3/033* (2006.01)
*A23C 9/12* (2006.01)
*A23C 9/142* (2006.01)
*A23C 9/15* (2006.01)

(52) U.S. Cl.
CPC .......... *A23C 9/1422* (2013.01); *A23C 9/1425* (2013.01); *A23C 9/15* (2013.01); *A23C 2210/206* (2013.01); *A23C 2210/252* (2013.01)

(56) References Cited

U.S. PATENT DOCUMENTS

| | | | |
|---|---|---|---|
| 4,569,611 A | | 2/1986 | Watanabe et al. |
| 4,820,348 A | * | 4/1989 | Harju .................. A23J 1/20 127/46.2 |
| 4,955,363 A | * | 9/1990 | Harju et al. .................. 127/46.1 |
| 5,503,864 A | | 4/1996 | Uchida et al. |
| 5,762,989 A | * | 6/1998 | Savello .................. A23C 9/137 426/34 |
| 6,787,158 B1 | * | 9/2004 | Erdmann ............. A23C 9/1465 424/535 |
| 6,881,428 B2 | * | 4/2005 | Lange .................. A23C 9/1206 426/34 |
| 8,445,052 B2 | * | 5/2013 | Holst .................... A23C 9/1206 426/34 |
| 2002/0051843 A1 | | 5/2002 | Baker et al. |
| 2003/0031754 A1 | | 2/2003 | Lange |
| 2005/0214409 A1 | * | 9/2005 | Tossavainen ........ A23C 9/1422 426/34 |
| 2006/0057247 A1 | * | 3/2006 | Nguyen ................. A23C 9/133 426/34 |
| 2008/0268100 A1 | * | 10/2008 | Tervala ................ A23C 9/1206 426/73 |
| 2009/0285934 A1 | * | 11/2009 | Nielsen ................ A23C 9/1216 426/35 |

FOREIGN PATENT DOCUMENTS

| | | | | |
|---|---|---|---|---|
| EP | 0 226 035 | | 7/1990 | |
| FI | 115 752 | | 11/2003 | |
| GB | 2 035 330 A | | 6/1980 | |
| JP | 6303900 | | 11/1994 | |
| WO | WO 00/45643 A1 | | 8/2000 | |
| WO | WO 03/094623 A1 | | 11/2003 | |
| WO | WO 03094623 A1 | * | 11/2003 | |
| WO | WO 2004/019693 | | 3/2004 | |
| WO | WO 2004/075667 | | 9/2004 | |
| WO | WO 2006/087409 | | 8/2006 | |
| WO | WO 2006087409 A1 | * | 8/2006 | ............... A23C 9/12 |

OTHER PUBLICATIONS

International Search Report for PCT/FI2008/050388, dated Oct. 13, 2008.
Written Opinion of the International Searching Authority for PCT/FI2008/050388, dated Oct. 13, 2008.
Finland Search Report for FI20075487, dated Jan. 21, 2008.
Metwalli, A.A.M. et al., "Heat Inactivation of Bovine Plasmin", International Diary Journal, vol. 8, (1998), pp. 47-56.
Extended European Search Report in EP 08 77 5513 dated Feb. 20, 2012.
Extended European Search Report issued in Appln. No. 17178944.9 dated Nov. 10, 2017.
Crudden et al. "Kinetics of changes in plasmin activity and proteolysis on heating milk," *Journal of Dairy Research*, vol. 72: pp. 493-504 (2005).
Third Party Observation filed in European Appln. No. 08775513.8 dated Aug. 14, 2017.

* cited by examiner

PROCESS FOR PRESERVING LOW-LACTOSE OR LACTOSE-FREE MILK PRODUCT

This application is the U.S. national phase of International Application No. PCT/FI2008/050388 filed 26 Jun. 2008, which designated the U.S. and claims priority to Finland Application No. 20075487 filed 26 Jun. 2007, the entire contents of each of which are hereby incorporated by reference.

FIELD OF THE INVENTION

The invention relates to a process for the production of a well-preserving low-lactose or lactose-free milk product.

BACKGROUND OF THE INVENTION

The shelf life of UHT (ultra-heat temperature) milk is as known limited by the natural or microbe-induced enzyme activities of milk. The best known of these problematic enzymes is the plasmin enzyme system that is very heat-stable. During warm storage, they cause changes in the taste, structure, etc.

In addition to the above-mentioned activities, low-lactose and lactose-free milks include side activities, such as proteolytic activities.

In addition to enzymatic changes, the shelf life of milk is also limited by Maillard browning products produced by the Maillard reaction which are especially problematic in lactose-hydrolyzed products. The Maillard browning products cause an undesirable change in the organoleptic properties of UHT milk, such as taste, colour, and structure. Monosaccharides, glucose and galactose, obtained in lactose hydrolysis are more reactive than lactose, which causes stronger Maillard browning reactions. In hydrolyzed milk, the molar content of these reducing monosaccharides is almost double in comparison with that of regular milk lactose.

The reduction of active lysine which is an important amino acid for the nutritional value of a milk-based UHT product continues during the storage at room temperature after the heat treatment. The Maillard reaction and lysine destruction continue during storage.

Heat treatment produces a complex between the β-lactoglobulin and the κ-casein of casein micelle (β-κ-complex). Gelation most probably takes place in two phases: in the first phase, the β-κ-complex detaches from the casein micelle during the storage of UHT milk, and in the second phase, a three-dimensional gel network is formed between the complexes. The precipitation occurring in UHT milk during storage is a result of slow proteolysis. Before gelation, κ-casein-type compounds are formed and the number of non-protein nitrogen compounds increases. The hydrolysis of proteins, i.e. proteolysis, may also promote casein precipitation under the effect of heat. Proteases formed by the natural microbe flora of milk mainly affect the formation of γ- and para-κ-casein, the proportion of which in the total casein is small. In UHT milk, proteases split κ-casein whose stabilising effect in casein micelle is, however, essentially important (Datta, N. and Deeth, C. Age gelation of UHT milk, a review. Food and Bioproducts Processing, 2001; 79(C4): 197-210).

Heat treatments and aseptic packaging methods are known in the field. UHT heat treatment may be either direct (vapour in milk, milk in vapour) or indirect (tube heat exchanger, plate heat exchanger, scraped-surface heat exchanger).

The preparation of low-lactose milk products is generally known. Several processes have been presented for removing lactose from milk. A conventional enzymatic process for the splitting of lactose is generally known in the field, the process comprising the step of adding lactase from fungus or yeast into milk in such a manner that lactose is split into monosaccharides, i.e. glucose and galactose, in over 80%.

Processes for removing lactose from milk raw material are also known, especially by using membrane techniques. Four basic membrane filtration processes are generally used: reverse osmosis (RO), nanofiltration (NF), ultrafiltration (UF), and microfiltration (MF). Of these, UF is mainly suitable for separating lactose from milk. Reverse osmosis is generally applied to concentration, ultra- and microfiltration to fractionation, and nanofiltration to both concentration and fractionation. A lactose removal process based on a membrane technique is described in WO publication 00/45643, for instance. A problem with this process, as with membrane techniques in general, is that during ultrafiltration not only lactose is removed from the milk, but also some of the salts that are significant for the taste of milk and milk products prepared thereof. A problem with ultrafiltration is also that it is difficult and expensive to achieve high protein content (over 80% of dry matter).

FI publication 115752 discloses a process in which a milk product is ultrafiltered, nanofiltered, and concentrated by reverse osmosis, after which the salts removed during ultrafiltration are returned to the UF retentate. The residual lactose of the thus obtained low-lactose milk product is hydrolyzed with a lactase enzyme into monosaccharides, whereby an essentially lactose-free milk product is obtained. With this process, lactose is removed from milk without affecting the organoleptic properties of the milk product being prepared.

A chromatographic separation is a process known per se and in industrial use in the sugar industry (examples are the separation of saccharose from molasses and fructose from a glucose-fructose mixture) as well as in the fractionation of whey (U.S. Pat. No. 3,969,337). In the process described in FI publication 78504 for recovering pure lactose from the whey of milk or cheese, a main part of lactose is first crystallised and the liquid of crystallisation purified by heating is fractionated chromatographically.

Lactose can also be specifically separated from milk by chromatography. However, many problems differing from the processing of whey are associated with the processing of milk, such as easy precipitation of casein, maintaining the micellar structure of casein, behaviour of fat, and extremely strict hygiene requirements. For instance EP publication 226035 B1 describes a lactose separation process in which milk is fractionated in such a manner that the lactose fraction is separated and the salts are in the protein fraction or protein-fat fraction. The process is characterised by balancing cation exchange resin by making its cation composition correspond to that of milk, and milk is chromatographed in a column with the balanced cation exchange resin at a temperature of approximately 50 to 80° C. by using water in elution. An advantage of the process is that all compounds essential to taste remain in the milk. However, chromatographic lactose separation is a slow and complex process that cannot directly be applied to conventional dairies without expensive equipment investments. The specific separation of milk lactose described in the patent publication was performed in a laboratory-scale column and the entire separation lasted 28 to 34 minutes. The separation was performed at 65° C. This treatment is not sufficient to inactivate the plasmin enzyme system. The patent publication also disclosed the option of performing the separation at a temperature of 80° C., but the whey proteins of milk then denature significantly. The process is not suitable for the preparation of a UHT milk drink with a long shelf-life.

it is also known to use milk as raw material after lactose removal in the preparation of dairy products. Recent studies have concentrated on membrane filtration of milk and on the use of such milk in the preparation of dairy products, such as cheese, ice cream and yogurt. Common to the known processes for preparing lactose-free products is that prior to ultrafiltration, milk is standardized to a desired fat content and pasteurized by heating it to a temperature of 60 to 90° C. Pasteurization is not sufficient to inactivate the plasmin enzyme system.

In the preparation of UHT milk combined from milk powder, the increase in the temperature of the preheating treatment from 75-80° C. to 90° C. improved the shelf life of UHT milk at room temperature (20 or 30° C., 8 months) (Newstead et al., Int. Dairy J. 16:2006, 573-579). The shelf life was estimated by monitoring the amount of sediment at the bottom of the package. Efficient inhibition of the plasmin-type proteolysis was given as the reason for the improvement in shelf life. In lactose-hydrolyzed milk, the preheating according to the publication or strengthening the UHT treatment, for example, strengthens the Maillard reaction that causes Maillard browning and taste defects and weakens the nutritional value as the amount of available lysine decreases.

Various pre- and post-heating treatments in the preparation of UHT milk are known to improve the shelf life of UHT milk. Driessen reduced the activity of plasmin and improved the shelf life of UHT milk by pre-heating milk at 55° C. for 60 minutes before high heat treatment. Milk proteolysis, bitterness and the development of transparency lessened and no gelatination occurred when milk was preserved at 20° C. for 11 weeks (Datta and Deeth, 2001). Kocak and Zadow found that the treatment of lactose-hydrolyzed milk after the UHT process at 55° C. for 40 to 60 minutes about doubled the shelf life time of the product (Aust J Dairy Technol 1989; 44(1): 37-40).

WO publication 2004/019693 describes a process for separating milk into individual components with membrane techniques and combining these components into milk products, such as ice cream, set-type or stirred yogurt and milk drink. The reconstituted milk raw material may be skim milk, low-fat milk, full-fat milk, lactose-free milk, concentrated milk, milk powder, organic milk or a combination of these.

Combining membrane methods and ion exchange for the preparation of a milk product, such as low-calcium milk powder, is known. WO publication 01/41579 describes a process that uses strong cation exchange resin preferably at a temperature of 4 to 12° C. The process can also be performed at 50° C. However, the 2.5-hour ion exchange treatment described in the patent publication is not sufficient to inactivate the plasmin enzyme system. In the process, the improvement in heat stability is based on reducing the calcium content with ion exchange.

A general problem with the known lactose removal processes and high heat treatments is a change in the organoleptic properties of milk or milk products made thereof. When making completely lactose-free products, in which the residual lactose content requirement is less than 0.01%, it is necessary to add more lactase enzyme than in low-lactose products. The taste of lactase-hydrolyzed milk products is not pure, but often contains a musty, chemical- or medicine-like off-taste, especially towards the end of the sales time. Known processes are also characterized in that products requiring a long shelf life time at room temperature (e.g. UHT products) show structural problems (precipitation, sedimentation), and in lactose-hydrolyzed products in particular, the Maillard reaction causes Maillard browning and changes in taste. A reduction of the nutritional value of the product is also associated with Maillard browning.

Trade and consumers require longer and longer sales times. The shelf life at room temperature of lactose-free and low-lactose UHT milk products made by conventional techniques is limited, typically three months. It is thus desirable to provide natural processes with which the shelf life of the organoleptic properties, such as taste properties, of the products, and their structure can be improved, which would then also extend the sales time.

UHT milk is milk that has been treated continuously at a high temperature for a short time and that has thereafter been immediately packaged aseptically. The heat treatment must be such that UHT milk passes the shelf life test and gives a positive result in the turbidity test (IDF Doc 2/1970, ref. IDF Annual Bulletin Part V, IDF Monograph on UHT milk, 1972) (in other words, some of the whey proteins remain undenatured). One part of the preservability test is a storage test according to which UHT milk must remain unchanged in its package at a temperature of 30±1° C. for 14 days. Low-lactose (e.g. Hyla®) and lactose-free milk already brown clearly during this type of storage.

A process for the preparation of low-lactose or lactose-free milk products (milks, milk drinks, whey drinks, concentrates) that are completely flawless in taste and have good shelf life without any extra costs has now been unexpectedly invented. The process of the invention also makes it possible to ensure improved shelf life for the product, enabling a longer than usual sales time, whereby structural defects, such as precipitation, decrease in nutritional value, risks related to microbiological problems, and the Maillard reaction, are minimized.

BRIEF DESCRIPTION OF THE INVENTION

The invention provides a new process for use in the preparation of well preserving low-lactose and lactose-free milk products, and the process is characterized by what is stated in the independent claim. Preferred embodiments of the invention are disclosed in the dependent claims. Taste, colour, and structural defects caused by natural milk enzyme activities and microbe-induced enzyme activities as well as the use of a lactase enzyme and side activities typical of commercial enzyme preparations in UHT products are avoided with the process of the invention. With the process of the invention, it is possible to improve the organoleptic properties, especially the stability of the taste properties and structure at room temperature, of low-lactose and lactose-free milk products, as a result of which the sales time of the product can be extended.

In addition, the Maillard browning products caused by the Maillard reaction and the related weakening of the nutritional value typical of UHT-treated lactose-free, and low-lactose milk products in particular, are avoided. Also, the hygiene risks in the preparation can be reduced.

The invention also provides a process that is simple, economic, industrially applicable on a large scale, and does not cause additional costs. It was unexpectedly found that by separating the sugar and protein fractions of milk or a mixture of milk and whey and by thermally treating them, it is possible to inactivate the natural plasmin enzyme system of milk and avoid the Maillard reaction that causes destruction of lysine and Maillard browning and obtain a raw material for use in the preparation of a milk product with a long shelf life.

A milk product made with the process of the invention keeps considerably longer than normal UHT milks. Especially the shelf life at room temperature of such milk is substantially longer.

DETAILED DESCRIPTION OF THE INVENTION

The present invention relates to a process for the preparation of a well-preserving low-lactose, lactose-free or carbohydrate-free milk product, comprising the steps of: separating the sugars and proteins of a milk raw material, or milk and whey raw material mixture into separate fractions, thermally treating at least the protein fraction to inactivate the natural plasmin enzyme system and other harmful enzymes therein, if desired, hydrolyzing lactose in the sugar fraction, heat treating said protein and sugar fractions, combining one or more of the fractions and other optional preparation agents into a milk product with the desired composition and sweetness.

In the process of the invention, the separation of the raw material into sugar and protein fractions is performed chromatographically, using membrane techniques, or by crystallizing in a manner known per se. Different separation methods may also be combined as desired in one or more steps. The sugar and protein of the raw material are preferably separated chromatographically and using membrane processes.

The sugar and protein fractions obtained in the raw material separation are treated thermally to inactivate their plasmin enzyme systems and other proteolytic enzymes. The thermal treatment can take place either during the separation or separately for each fraction after the separation. Sugar and protein separation is typically performed at a temperature of 3 to 80° C., preferably 60 to 70° C. and most preferably 65° C. The separation typically takes from 10 minutes to 10 hours, preferably 2 to 10 hours, more preferably 2 to 6 hours.

Chromatographic separation in neutral (pH 6 to 7) conditions typically takes from 10 minutes to 10 hours, preferably 2 to 4 hours, and it is performed at a temperature of 3 to 70° C., preferably 60 to 70° C., especially 65° C.

In an embodiment of the invention, when the sugar and protein separation is performed at lower temperature ranges, longer separation times are used, whereas when operating at higher separation temperatures, lower separation times are preferred. The separation can be accomplished for instance at 65° C. in 1 to 3 hours, at 70° C. in 0.5 to 1 hour, at 75° C. in 10 minutes to 0.5 hour, or at 80° C. in less than 10 minutes.

Figure 1:
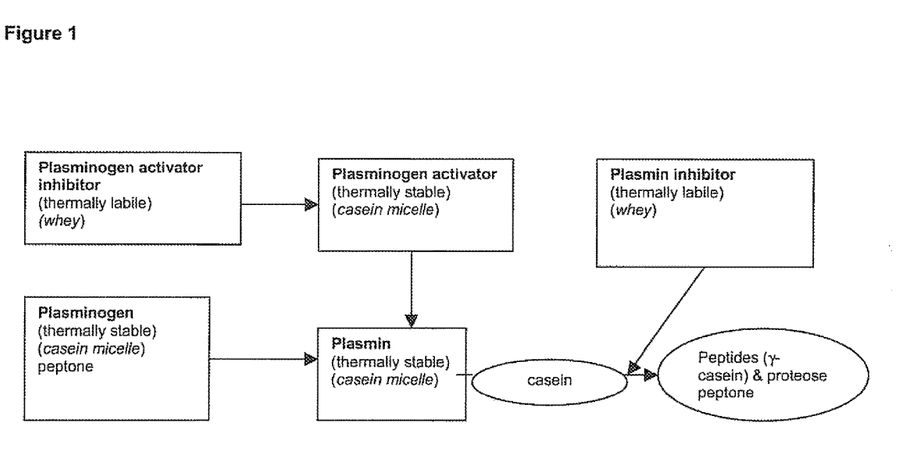
FIG. 1: Plasmin enzyme system (modified Datta and Deeth, 2001).

The plasmin enzyme system of milk is described in general in FIG. 1. In raw milk, plasmin is in an enzymatically active form (thermally stable plasmin) and as an inactive precursor (thermally stable plasminogen). In raw milk, their weight ratio is 1:9 to 10. An activator (thermally stable plasminogen activator) and inhibitors (thermally labile plasminogen activator inhibitor and plasmin inhibitor) control the activity of plasmin. Plasmin associates with casein micelles. Thermal treatment of milk alters the natural ratio between the activators and inhibitors in favour of the activators. Heat treatment, such as UHT, promotes the transformation of plasminogen into plasmin, which causes proteolysis and precipitation of UHT milk especially during storage (Datta and Deeth, 2001). Decimal reduction time D that represents the inactivation of the plasmin enzyme is 55.6 min at 67.5° C. The half-life of plasmin is 35.3 min at 70° C., that of plasminogen is 33.3 min and that of the plasmin inhibitor is 34.5 min. [Driessen F. M., Inactivation of lipases & proteinases (indigenous & bacterial), Bulletin of IDF 238, 1989, 71-93] In the process of the invention, chromatographic separation removes the problematic proteolytic enzyme activities that cause, among other things, taste and structural problems in UHT milk products when stored at room temperature.

An example of a particularly preferable embodiment of the invention that inhibits the plasmin enzyme system permanently is chromatographic separation in which inactivation occurs simultaneously with separation, when the residence time in the column at 65° C. is 2 to 3 hours. The inactivation is irreversible.

The obtained sugar and protein fractions are combined into a product with a required composition and sweetness. Also, other preparation components can be introduced into the product. In the process of the invention, some of the milk salts may be lost, in which case these may be returned in this combination step as an RO concentrate (concentrate obtained by reverse osmosis) or powder, for instance. Part of the sugar fraction, or all of it, obtained from lactose hydrolysis may then also be added to the protein fraction. Other sweeteners, such as non-reducing sugar or an artificial sweetener, and vitamins may also be added to the milk product.

If necessary, the lactose contained in the milk product combined as mentioned above may be hydrolyzed in a manner known per se. In an embodiment of the invention, the lactose is hydrolyzed prior to combining the protein and sugar fractions into a milk product.

The process of the invention uses a technique known per se in the heat treatment of milk products, and in aseptic packaging. Examples of heat treatments to be used in the process of the invention are pasteurization, high pasteurization, or heating at a temperature lower than the pasteurization temperature for a sufficiently long time. Worth mentioning in particular are UHT treatment (e.g. milk at 138° C., 2 to 4 s), ESL treatment (e.g. milk at 130° C., 1 to 2 s), pasteurization (e.g. milk at 72° C., 15 s), or high pasteurization (95° C., 5 min). The heat treatment may be either direct (vapour to milk, milk to vapour) or indirect (tube heat exchanger, plate heat exchanger, scraped-surface heat exchanger). UHT treatment is preferably used in the process of the invention. In an embodiment of the invention, the heat treatment is accomplished after combining the protein and sugar fractions into a milk product. In another embodiment of the invention, the heat treatment is performed to sugar and protein fractions separately prior to combining them into a milk product.

The milk raw material used in the process of the invention refers to milk, whey, and combinations of milk and whey. The milk raw material may also be supplemented with various fat, protein, or sugar fractions, etc. Milk is understood to comprise milk components having different fat, protein, and lactose contents. Combined milk may thus be for instance full-fat milk, low-fat milk, or skim milk, ultra-filtered milk, diafiltered milk, or recombined milk from milk powder, organic milk or a combination of these.

The process of the present invention is suitable for the preparation of all types of milk products including those containing whey. A drink with the required composition, properties and sweetness is combined from various fractions and other preparation agents. The process is typically suitable for the preparation of low-lactose, lactose-free, or carbohydrate-free UHT milk. Specifically, the process is suitable for the preparation of lactose-free UHT milk. More specifically, a carbohydrate-free UHT milk product is prepared. In this application, the term lactose-free milk product refers to a milk product with a lactose content of less than 0.01%. A low-lactose milk product refers to a milk product with a lactose content of less than 1%. A carbohydrate-free milk product refers to a milk product with a carbohydrate content of less than 0.5%.

The organoleptic properties of a milk product prepared according to the invention unexpectedly keep at room temperature even during a long storage. The nutritional value of a well-preserving milk product prepared with the process of the invention does not weaken even during storage. The process is easy to perform in production conditions without significant extra costs.

The process of the invention is also suitable for modern component preparation in which milk components having different fat, protein, and lactose contents are combined in a known manner only just before aseptic packaging.

The process of the invention may be applied to both batch and continuous production. Preferably, the process of the invention is performed as a batch process.

The invention also relates to an especially well-preserving low-lactose, lactose-free or carbohydrate-free product containing milk and/or whey which is prepared by the process described above. In an embodiment of the invention, the product is prepared by combining one or more sugar and protein fractions obtained in the separation and other optional preparation components in the desired combination and ratio. An aspect of the invention provides a low-lactose milk product derived from the sugar and protein fractions so as to contain less than 1% lactose. Another aspect of the invention provides a lactose-free product derived from the sugar and protein fractions so as to contain less than 0.01% lactose. Still another aspect of the invention provides an essentially carbohydrate-free product. This is preferably formulated from the protein fraction obtained from the separation procedure.

The following examples illustrate the invention but do not limit the invention to the embodiments mentioned.

EXAMPLE 1

Carbohydrate-free UHT Milk

Description of Chromatographic Separation and Compositions of Fractions

A column (height 9 m, diameter 3 m) was packaged with a strong cation-exchange resin (Finex Oy) with an average particle size of 0.4 mm and a structure similar to Duolite C 2404 F (Duolite International, SA, Rohm and Haas), for instance. The resin volume of the packed column tempered to a temperature of 65° C. was 30 000 L. To achieve ion balance, skim milk (pH 6.7, 25 000 L) was pumped through the column and flushed with water. Into the column, 4 000 L of skim milk concentrate (dry content 29%) was fed and eluted with demineralised water at a flow rate of 4 000 L/h. Sugar and protein fractions were collected. The fractions remained in the column at 65° C. for 3 hours, after which they were cooled to below 10° C.

Table 1 shows the composition of the skim milk fractions after chromatographic separation. The separation was performed in such a manner that the protein fraction contained as little lactose as possible.

TABLE 1

Compositions of fractions after chromatographic separation according to example 1

| | Skim milk (initial situation) | Protein fraction | Lactose fraction | Skim milk concentrate (29%) (initial situation) |
|---|---|---|---|---|
| Volume (L) | 12 500 | 5 600 | 7 600 | 4 000 |
| Ash (%) | 0.7 | 1.1 | 0.6 | 2.2 |
| Protein (%) | 3.5 | 6.0 | 1.4 | 10.2 |
| Lactose (%) | 4.7 | 0.05 | 8.7 | 16.5 |
| Dry matter (%) | 9.3 | 7.4 | 10.5 | 28.9 |

The Preparation of (Carbohydrate-free) UHT Milk of the Invention

The carbohydrate-free UHT milk of the invention was prepared of a protein fraction (688 L) and water (312 L) and a non-reducing sweetener sucralose (Splenda, 0.0027%). The solution was heat treated (direct UHT 146° C., 4 s) and packaged aseptically. A carbohydrate-free UHT milk product was obtained.

The shelf life of UHT milk prepared in accordance with the invention was monitored for 6 months by determining the progress of proteolysis in tyrosine equivalents and using SDS-PAGE, by determining the furosine content as a marker of the Maillard reaction and the organoleptic properties (structure as the formation of flakes, sediment and precipitation, taste and colour). A comparison was made with regular skim and lactose-hydrolyzed (hydrolysis prior to heat treatment) UHT milk (direct UHT 146° C., 4 s).

Proteolysis

Table 2 shows the progress of proteolysis in carbohydrate-free UHT milk prepared in the manner described in the invention and stored at 22° C. for 36 weeks in comparison with the proteolysis of normal lactose-hydrolyzed milk (=low-lactose milk).

TABLE 2

Tyrosine equivalent content as a measure of proteolysis during storage
Tyrosine equivalent content (mg/L)

| Time (weeks) | Normal lactose-hydrolyzed UHT milk (reference) | Carbohydrate-free UHT milk (invention) |
|---|---|---|
| 0 | 95 | 51 |
| 4 | 298 | 71 |
| 8 | 454 | 88 |
| 12 | 609 | 93 |
| 36 | 1100 | 115 |

Tyrosine content in tyrosine equivalents describes the progress of proteolysis. In the carbohydrate-free UHT milk of the invention, there is thus clearly less proteolysis than in the reference milk.

Figure 2:
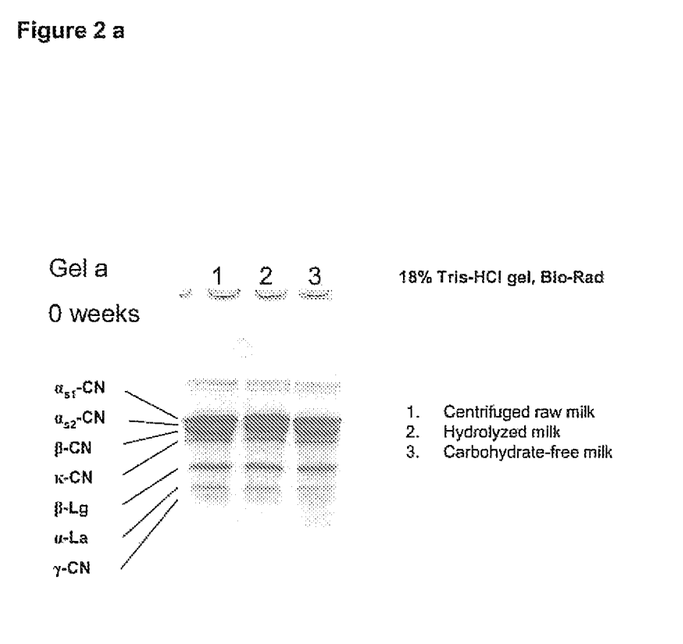
FIG. 2a: SDS-PAGE analysis on UHT milk samples after processing.
FIG. 2b: SDS-PAGE analysis on UHT milk samples after 4-week storage.
FIG. 2c: SDS-PAGE analysis on UHT milk samples after 12-week storage.

FIGS. 2a to 2c show an SDS-PAGE analysis of proteolysis changes after storage of 0, 4, and 12 weeks. The carbohydrate-free milk has kept nearly as well as the original (comparison with centrifuged raw milk and/or UHT milks at 0 weeks), whereas in the lactose-hydrolyzed milk the casein bands have weakened a great deal and the gamma casein band strengthened. This refers to plasmin enzyme activity [Datta N. and Deeth H. C., Lebensm.-Wiss. Technol. 36 173-182 (2003)]. In milks prepared with the process of the invention, the activity of the plasmin enzyme system is inhibited.

Maillard Browning Reactions

Figure 3:
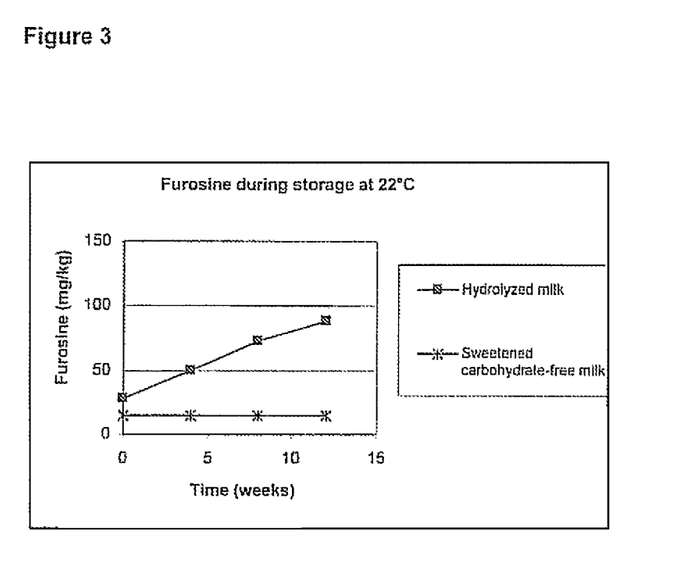
FIG. 3: Development of furosine content in UHT milk as a function of the storage time.

The development of Maillard browning reactions was monitored by determining the furosine content (IDF standard 193/ISO standard 18329, 2004). FIG. 3 shows the development of furosine content describing the Maillard reaction in UHT milk prepared in accordance with the invention and in normal lactose-hydrolyzed UHT milk. The least amount of furosine and Maillard browning reactions were generated during storage in sweetened carbohydrate-free milk.

Organoleptic Properties

During storage, the carbohydrate-free UHT milk prepared in accordance with the invention showed no formation of flakes, sediments or precipitates. During storage, no taste or smell foreign to normal UHT milk was detected.

Figure 4:
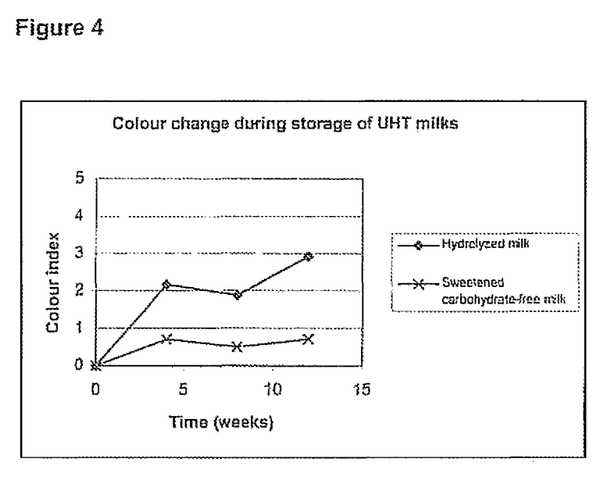
FIG. 4: Colour change in UHT milks as a function of the storage time when storing at 22° C.

FIG. 4 shows the change of colour in milk as a function of the storage time at 22° C. It is possible to avoid completely the change of colour in the carbohydrate-free milk prepared in accordance with the invention, whereas in a normal lactose-hydrolyzed product, Maillard browning is strong. During storage at higher temperatures, the difference between the milks increased even more.

Nutritional Quality

Nutritional quality was estimated from an amount of nutritionally unavailable lysine calculated on the basis of the furosine content in the manner described by Evangelisti et al. (Evangelisti, F., Calcagno, C., Nardi, S., Zunin, P., J. Dairy Res. 66: 1999:237-243). The nutritional quality of the carbohydrate-free milk prepared with the process of the invention was good.

EXAMPLE 2

Preparation of Well-preserving Low-lactose UHT Milk

Lactose-hydrolyzed UHT Milk of the Invention

UHT milk raw material was combined from protein fraction (62% by volume) and lactose fraction (38% by volume) described in table 3.

Before combining the fractions, 0.10% lactase (Godo YNL2) was added to the lactose fraction. The hydrolysis temperature was 37° C. and duration 4 hours. The protein fraction was heat treated (UHT 146° C., 4 s) and pumped into a sterile tank after cooling to 10° C. (milk base). The lactase treated lactose fraction was run through the same UHT process and added to the above milk base.

TABLE 3

Chromatographic separation of milk performed with milk protein collected as thoroughly as possible to protein fraction

| | Skim milk (initial situation) | Protein fraction | Lactose fraction | Skim milk concentrate (20%) (initial situation) |
|---|---|---|---|---|
| Volume (L) | 12500 | 7930 | 5300 | 4000 |
| Ash (%) | 0.75 | 1.21 | 0.17 | 2.5 |
| Protein (%) | 3.53 | 5.35 | 0.1 | 10.9 |
| Lactose (%) | 4.65 | 0.77 | 11.5 | 17.9 |
| Dry matter (%) | 9.28 | 7.63 | 11.9 | 28.9 |

The combined solution was packaged aseptically. A low-lactose UHT milk product was obtained with very little Maillard browning during preparation and with an inactivated milk plasmin enzyme system. At room temperature, the milk kept clearly better than conventionally prepared lactose-hydrolyzed milk.

EXAMPLE 3

Low-lactose UHT Milk Product

Skim milk was ultrafiltered at 50° C. with concentration factor (CF) 4 to obtain an UF retentate, the composition of which is shown in table 4. The UF permeate obtained from ultrafiltration was nanofiltered at 10° C. with CF 4. The compositions of the obtained fractions are shown in table 5.

TABLE 4

Compositions of fractions at first filtration

| | Skim milk (initial situation) | UF retentate 1 | NF retentate 1 | NF permeate 1 |
|---|---|---|---|---|
| Volume (L) | 1000 | 250 | 187.5 | 562.5 |
| Ash (%) | 0.75 | 1.58 | 1.11 | 0.25 |
| Protein (%) | 3.53 | 13.72 | 0.4 | 0 |
| Lactose (%) | 4.65 | 4.6 | 17.1 | 0 |
| Dry matter (%) | 9.28 | 19.8 | 19.6 | 0.27 |

NF permeate 1 and UF retentate 1 were combined and ultrafiltered with CF 3.6 at 50° C. UF permeate 2 was further nanofiltered at 10° C. with CF 12. The compositions of the fractions are shown in table 5.

TABLE 5

Composition of fractions at second filtration

|  | Feed | UF retentate 2 | NF retentate 2 | NF permeate 2 |
|---|---|---|---|---|
| Volume (L) | 812.5 | 225.7 | 48.9 | 537.9 |
| Ash (%) | 0.66 | 1.30 | 0.86 | 0.17 |
| Protein (%) | 4.22 | 14.65 | 0 | 0 |
| Lactose (%) | 1.48 | 1.64 | 16.8 | 0 |
| Dry matter (%) | 6.28 | 18.5 | 18.9 | 0.19 |

UF retentate 2 and NF permeate 2 obtained at the second filtration were combined (763 liters, protein 4.33%, lactose 0.52%, ash 0.50%, and dry matter 5.6%) and heat treated (direct UHT 146° C., 4 s). The milk base was cooled to 65° C. and transferred to a sterile tank for 2 hours. After this, the milk base was cooled to 5° C.

An amount of 107 liters of water was added to 129 liters of NF retentate 1 from the first filtration. Lactase (Godo YNL2) 0.10% was added to the mixture. The hydrolysis temperature was 37° C. and duration 4 hours. The solution was heat treated (direct UHT 146° C., 4 s) and mixed in a sterile tank with a milk base, the preparation of which is described in the previous paragraph.

This produced a low-lactose UHT milk drink that contained 3.45% protein, 2.6% carbohydrates (lactose <0.5%), ash 0.52%, and dry matter 7.4%.

Figure 5:
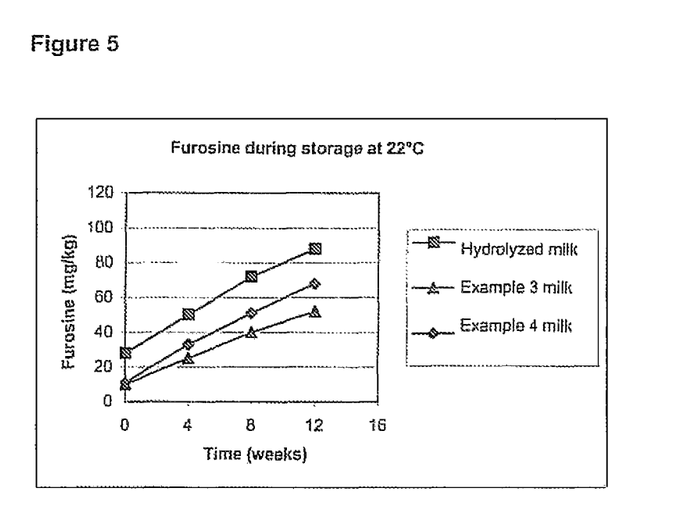
FIG. 5: Furosine content of UHT milks.

The milk drink prepared with the process of the invention was stored at room temperature (22° C.) for 12 weeks. The progress of the Maillard reaction that causes Maillard browning in a milk drink was monitored by analyzing the furosine content of the milk at 4-week intervals (FIG. 5). A comparison was made with normal skim and lactose-hydrolyzed (hydrolysis prior to heat treatment) UHT milk (direct UHT 142° C., 4 s). Proteolysis was similar to that of the carbohydrate-free milk shown in table 2.

The results of FIG. 5 show that the UHT milk drink prepared with the process of the invention during heat treatment shows much less Maillard browning than normal lactose-hydrolyzed comparison milk. Therefore, the Maillard reaction product content during storage was also much lower. In addition, the taste of the UHT milk prepared in accordance with the invention was after 12 weeks found to be clearly better than that of the normal lactose-hydrolyzed milk. No off-taste or precipitation was detected.

EXAMPLE 4

Low-lactose UHT Milk Product

Skim milk was processed with a membrane technique in two steps as in example 3. Unlike example 3, 188 liters of NF retentate 1 was taken from the first filtration and 49 liters of NF retentate 2 was taken from the second filtration. Differing from example 3, water was not added to the mixture. Lactase (Godo YNL2) 0.10% was added to the mixture. The hydrolysis temperature was 37° C. and duration 4 hours. The solution was heat treated (direct UHT 146° C., 4 s) and mixed in a sterile tank with milk base prepared in the manner described in example 3.

This way, a low-lactose UHT milk drink was produced containing protein 3.5%, carbohydrates 4.7% (lactose <0.5%), ash 0.7%, and dry matter 9.3%.

A UHT milk drink shows less Maillard browning during heat treatment than normal lactose-hydrolyzed comparison milk (FIG. 5). Therefore, the Maillard reaction product content is also clearly lower during storage. In addition, after 12 weeks, UHT milk prepared in accordance with the invention tasted clearly better than the normal lactose-hydrolyzed comparison milk. No off-taste or precipitation was detected.

EXAMPLE 5

Low-lactose UHT Milk Product with Whey

Skim milk (900 L) and whey (100 L) were ultrafiltered and nanofiltered as described in example 3. The composition of the obtained fractions is shown in table 6.

TABLE 6

Compositions of fractions at first filtration

|  | Skim milk and whey (initial situation) | UF retentate 1 | NF retentate 1 | NF permeate 1 |
|---|---|---|---|---|
| Volume (L) | 1000 | 250 | 187.5 | 562.5 |
| Ash (%) | 0.75 | 1.55 | 1.09 | 0.22 |
| Protein (%) | 3.19 | 12.3 | 0.35 | 0 |
| Lactose (%) | 4.61 | 4.7 | 17.1 | 0 |
| Dry matter (%) | 8.46 | 19.1 | 19.4 | 0.30 |

NF permeate 1 and UF retentate 1 were combined and ultrafiltered and UF permeate 2 was further nanofiltered as in example 3. The compositions of the fractions are shown in table 7.

TABLE 7

Compositions of fractions at second filtration

|  | Feed | UF retentate 2 | NF retentate 2 | NF permeate 2 |
|---|---|---|---|---|
| Volume (L) | 812.5 | 225.7 | 48.9 | 537.9 |
| Ash (%) | 0.66 | 1.32 | 0.79 | 0.16 |
| Protein (%) | 3.80 | 13.7 | 0 | 0 |
| Lactose (%) | 1.50 | 1.64 | 16.2 | 0 |
| Dry matter (%) | 6.10 | 17.1 | 18.1 | 0.19 |

UF retentate 2 and NF permeate 2 obtained at second filtration were combined (763 L, protein 4.05%, lactose 0.52%, ash 0.50%, and dry matter 5.2%) and heat treated, and the obtained whey milk base was cooled, processed in a sterile tank and cooled as described in example 3.

An amount of 129 liters of NF retentate 1 obtained at first filtration and 107 liters of water were mixed. Lactase was added to the mixture that was then hydrolyzed, the solution was heat treated and mixed in a sterile tank with the whey milk base as described in example 3.

This way, a low-lactose UHT whey milk drink was obtained containing protein 3.14%, carbohydrates 2.6% (lactose <0.5%), ash 0.48%, and dry matter 6.9%.

The UHT whey milk drink shows less Maillard browning during heat treatment than normal lactose-hydrolyzed milk. Therefore, the Maillard reaction product content during storage was also clearly lower. No off-taste or precipitation was detected in the UHT whey milk after 12-week storage.

EXAMPLE 6

The Inactivation of Plasmin and Plasminogen

The effect of a short-term 3- to 70-minute thermal treatment on the plasmin enzyme system was examined by heating pasteurized skim milk (25 ml) at a temperature of 65 to 95° C. The treatment time was 3, 5, 7, 9, 20, 50, and 70 minutes and the corresponding temperatures were 95, 90, 85, 80, 75, 70, and 65° C. After thermal treatment, the skim milk was immediately cooled to below 5° C., and the relative plasmin and plasminogen activities were determined.

Determining the activity of plasmin and plasminogen: 6 ml of pasteurized skim milk was centrifuged (25° C., 1 h, ca. 60 000 g), and the casein at the bottom of the test tube was dissolved into 3 ml of 0.05 Tris-HCl 0.1 M EDTA buffer (pH 7.4). Into the cuvette (1 ml) was added 600 µl of buffer (0.05 Tris-HCl 0.1 M EDTA buffer, pH 7.4), 300 µl of 2 mM D-Val-Leu-Lys-PNA.2HCl (peptide dissolved in 5% dimethylformamide), and 100 µl of the above-mentioned dissolved casein. Samples were incubated at 30° C. Absorbance (405 nm) was measured at time instant 0 and after 3 hours against the buffer.

The plasminogen activity was determined by adding into the cuvette 5 µl of urokinase (100 PU) and by measuring absorbance (405 nm) after incubating for 3 hours. The total incubation period was thus 6 hours.

Relative plasmin activity was calculated by comparing the absorbance changes of the samples during the 3-hour incubation with the comparison sample, i.e. normal pasteurized milk. Relative plasminogen activity was calculated by subtracting from the absorbance of the latter 3-hour incubation the absorbance after the addition of urokinase and then the absorbance change (plasmin activity) of the first 3 hours of the corresponding sample and the 0.0059 absorbance change caused by urokinase.

Results: Short-term 20-minute thermal treatment at 75° C. and 9-minute thermal treatment at 80° C. effectively inactivated the plasmin and plasminogen activities of the plasmin system (table 8).

TABLE 8

Relative plasmin and plasminogen activities of thermally treated pasteurized skim milk

| Temperature ° C. | Time Min | Plasmin activity % | Plasminogen activity % |
|---|---|---|---|
| Comparison (no treatment) | | 100 | 100 |
| 65 | 70 | 100 | 82 |
| 70 | 50 | 77 | 67 |
| 75 | 20 | 4 | 2 |
| 80 | 9 | <1 | <1 |
| 85 | 7 | <1 | <1 |
| 90 | 5 | <1 | <1 |
| 95 | 3 | <1 | 1 |

EXAMPLE 7

UHT Milk Product

Skim milk was treated with a membrane technique in two steps as in example 3. Differing from example 3, the UF retentate 2 and NF permeate 2 obtained during the second filtration were combined to form the milk base that was divided into two parts. One part was heated to 80° C. and the milk base was kept at this temperature for 10 minutes, and the second part was correspondingly heated to 75° C. and the milk base was kept at this temperature for 20 minutes. Immediately after this, the milk bases were heat treated (direct UHT 146° C., 4 s), and cooled to 5° C. A low-lactose UHT milk product was prepared from these milk bases as described in example 3.

The Maillard browning of the UHT milk products was at the same level as in the UHT milk drink of example 3. The milk drinks prepared with the process of the invention were stored at room temperature (22° C.) for 12 weeks. Normal fat-free lactose-hydrolyzed UHT milk was used for comparison. During the storage time, contrary to the comparison milk, the milk drinks prepared with the process of the invention did not develop a bitter off-taste indicating proteolytic activity.

The invention claimed is:

1. A process for the preparation of a well-preserving low-lactose, lactose-free or carbohydrate-free milk product, comprising the steps of:
    separating sugars and proteins in a milk raw material or milk and whey raw material mixture into a sugar fraction and a protein fraction, respectively,
    thermally treating at least the protein fraction at 60 to 70° C. for 2 to 10 hours to inactivate the natural plasmin enzyme systems and other harmful enzymes therein either during or after the separation into the sugar and protein fractions,
    heat treating the thermally treated protein fraction and the sugar fraction, and
    composing the well-preserving low-lactose, lactose-free or carbohydrate-free milk product with a desired composition and sweetness from the resultant heat-treated protein fraction.

2. The process as claimed in claim 1, wherein the separation in neutral conditions is performed chromatographically or using membrane techniques or by crystallization or by combining these techniques in one or more steps.

3. The process as claimed in claim 1, wherein the thermal treatment is performed during the separation.

4. The process as claimed in claim 1, wherein the separation is performed chromatographically at a temperature of 65° C. during 2 to 4 hours.

5. The process as claimed in claim 1, wherein the heat treatment is performed by pasteurizing, high pasteurizing, using ESL treatment or UHT treatment, preferably UHT treatment.

6. The process as claimed in claim 1, wherein the heat treatment is accomplished after or prior to combining the protein and sugar fractions into the milk product.

7. The process as claimed in claim 1, wherein the process is component preparation in which milk and whey components having different fat, protein and lactose contents are combined prior to aseptic packaging.

8. The process as claimed in claim 1, wherein the preparation process is either continuous or a batch process.

9. The process as claimed in claim 1, wherein a carbohydrate-free milk product is prepared.

10. The process as claimed in claim 1, wherein the separation in neutral conditions is performed chromatographically and with membrane techniques.

11. The process as claimed in claim 1, wherein the separation is performed during 2 to 6 hours.

12. The process as claimed in claim 1, wherein a carbohydrate-free, UHT or ESL milk product is prepared.

13. The process of claim 1, wherein the step of composing the well-preserving low-lactose, lactose-free or carbohydrate-free milk product further includes with composing the well-preserving low-lactose, lactose-free or carbohydrate-free milk product with the sugar fraction.

14. The process of claim 13, wherein lactose in the sugar fraction is hydrolyzed.

15. The process of claim 14, wherein the lactose is hydrolyzed after or prior to combining the protein and sugar fractions.

\* \* \* \* \*